Dec. 27, 1927.
H. STYRI
1,654,101
CAGE FOR BALL BEARINGS
Filed Nov. 17, 1926
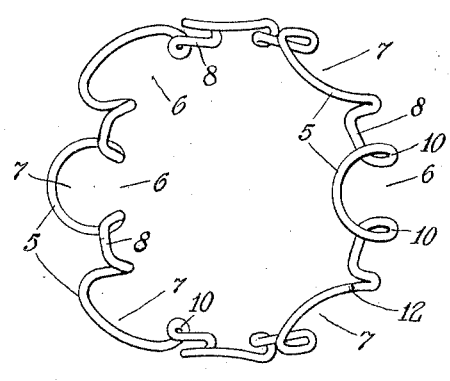
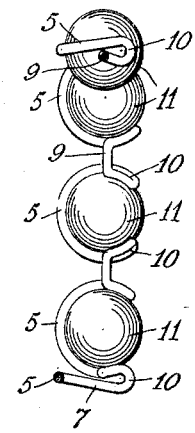
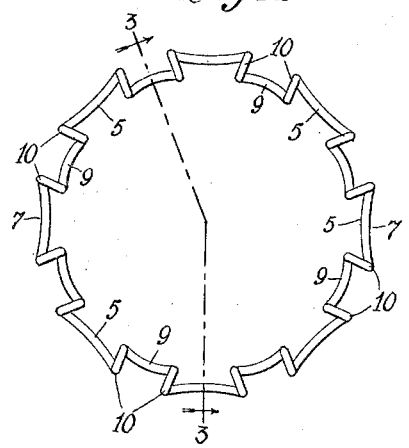
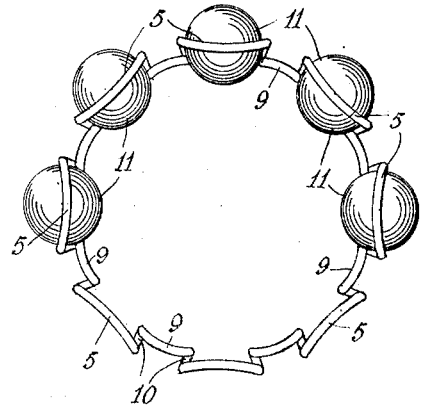
INVENTOR
ATTORNEY Patented Dec. 27, 1927.

1,654,101

UNITED STATES PATENT OFFICE.

HAAKON STYRI, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

CAGE FOR BALL BEARINGS.

Application filed November 17, 1926. Serial No. 148,804.

This invention relates to cages for ball bearings and has for an object to afford an efficient ball retaining and spacing cage formed of a single piece of wire and having the capability of being snapped on to and off of a set of balls when these are assembled between the rings of a deep groove ball bearing of the Conrad type, and this irrespective of whether the bearing has one row or two rows of balls.

In the drawings accompanying this specification a preferred embodiment of the invention is illustrated, in which drawings, Figure 1 shows the cage in perspective.

Fig. 2 is an elevation looking at the cage from the opposite side to that shown in Figure 1.

Fig. 3 is a section taken at about the plane of the line 3—3 of Fig. 2 and

Fig. 4 is a view from the opposite side of the showing in Fig. 2.

The cage illustrated in the drawing is shown as bent from a single piece of wire and comprises a series of loops, 5, having mouths, 6, opening toward one side and forming ball pockets, 7. The wire between the pockets is formed into a series of shorter loops, 8, also opening toward the same side, the extremities of these loops, indicated in Fig. 3 by the reference character, 9, being shown lying between the pockets, 7, and approximately in the region of the shortest distance between ball positions. The bights of the wire connecting the loops, 5 and 8, are shown forming open eyes, 10, a pair of these eyes lying at the mouths, 6, of the pockets for contacting the sides of the balls; there being an eye at each side of the space between balls positions. The balls, 11, illustrated in the drawing are represented in about the positions they assume in a bearing of the Conrad type, the width of the intermediate loops, 8, being proportioned to the desired spacing apart of the balls. In most instances the ends or extremities, 9, of the intermediate or spacing loops lie in the plane of the centers of the balls of this set.

The ends of the wire will be fastened together in some suitable manner, a brazed connection being illustrated at, 12, in Figure 1.

The elasticity of the cage is such that it may readily be snapped on to a series of balls after these have been assembled between the rings of a deep groove bearing, and when formed as illustrated in the drawing and in position the eyes, 10, formed by the bights are so located that the cage is supported on the inner sides of the balls at the bottom of the bearing. The cage can also be readily snapped off of the set of balls without injury to it or to the bearing and be capable of replacement.

It will be obvious that changes may be made in the form and dimension of the bends of the wire within the scope of the claims without departing from the spirit of the invention.

Having described my invention I claim and desire to secure by Letters Patent:

1. A cage for a ball bearing, comprising a single wire bent into a series of loops opening toward one side and forming ball pockets, the wire between pockets being formed into a series of spacing loops opening toward the same side, the extremities of these spacing loops lying between the pockets, the bights of wire connecting the loops of the respective series forming a pair of eyes at the mouth of each of the pockets for engaging the sides of a ball.

2. A cage for a ball bearing, comprising a single wire bent into a series of loops opening toward one side and forming ball pockets, the wire between pockets being formed into a series of spacing loops opening toward the same side, the extremities of these spacing loops lying between the pockets approximately in the region of the shortest distance between ball positions, the bights of wire connecting the loops of the respective series forming a pair of eyes at the mouth of each of the pockets for engaging the sides of a ball.

3. A cage for a ball bearing, comprising a single wire bent into a series of loops opening toward one side and forming ball pockets, the wire between pockets being formed into a series of spacing loops opening toward the same side and disposed inwardly of the pocket forming loops, the extremities of these spacing loops lying between the pockets approximately in the region of the shortest distance between ball positions, the bights of wire connecting the loops of the respective series forming a pair of eyes at the mouth of each of the pockets for engaging the sides of a ball.

4. A cage for a ball bearing, comprising a single wire bent into a series of loops opening toward one side and forming ball pockets, the wire between the pockets presenting the appearance of having been first formed into loops opening toward the other side, the ends of such latter loops being bent back upon the inner sides of the pocket forming loops, the bends forming a pair of eyes at the mouth of each of the pockets for engaging the sides of the balls, and the extremities of the loops lying between the pockets.

5. A cage for a ball bearing, comprising a single wire bent into a series of loops opening toward one side and forming ball pockets, the wire between the pockets presenting the appearance of having been first formed into loops opening toward the other side, the ends of such latter loops being bent back upon the inner sides of the pocket forming loops, the bends forming a pair of eyes at the mouth of each of the pockets for engaging the sides of the balls, and the extremities of the loops lying between the pockets approximately in the region of the shortest distance between ball positions.

Signed at the city of Philadelphia, Pennsylvania, this 4th day of November, 1926.

HAAKON STYRI.